(12) United States Patent
Takechi et al.

(10) Patent No.: US 7,418,511 B2
(45) Date of Patent: Aug. 26, 2008

(54) SECURED TCP/IP COMMUNICATION SYSTEM FOR DEVICES AND PRIVATE NETWORKS CONNECTED TO THE INTERNET

(75) Inventors: Hideaki Takechi, Toyonaka (JP); Naonori Kato, Hirakata (JP); Hidetoshi Takeda, Hirakata (JP); Toshiki Yamamura, Suita (JP); Shinji Hamai, Kadoma (JP); Tadashi Kunihira, Sakai (JP)

(73) Assignee: Matsushita Electric Indutrial Co., Ltd., Osaka (JP)

( * ) Notice: Subject to any disclaimer, the term of this patent is extended or adjusted under 35 U.S.C. 154(b) by 635 days.

(21) Appl. No.: 10/498,826

(22) PCT Filed: Sep. 10, 2003

(86) PCT No.: PCT/JP03/11561

§ 371 (c)(1),
(2), (4) Date: Jun. 23, 2004

(87) PCT Pub. No.: WO2004/030314

PCT Pub. Date: Apr. 8, 2004

(65) Prior Publication Data
US 2005/0015584 A1    Jan. 20, 2005

(30) Foreign Application Priority Data
Sep. 27, 2002 (JP) ............................ 2002-283287

(51) Int. Cl.
*G06F 15/16* (2006.01)
(52) U.S. Cl. ........................ 709/229; 709/225; 709/227; 709/229; 709/245

(58) Field of Classification Search ................. 709/225, 709/227, 229, 245, 230
See application file for complete search history.

(56) References Cited

U.S. PATENT DOCUMENTS 5,740,160 A * 4/1998 Ikegami et al. .............. 370/255

(Continued)

FOREIGN PATENT DOCUMENTS

WO     02/071704      9/2002

OTHER PUBLICATIONS

W. Richard Stevens, "TCP/IP Illustrated, vol. 1: The Protocols," Dec. 31, 1993, Addison Wesley Professional, Chapter 23.*

(Continued)

*Primary Examiner*—Jeffrey Pwu
*Assistant Examiner*—Farhad Ali
(74) *Attorney, Agent, or Firm*—Greenblum & Bernstein, P.L.C.

(57) ABSTRACT

A communication system includes a device and a server connected to the Internet, which transfers communications between the device and a terminal connectable to the Internet via the server. The device periodically transmits a notice packet to the server. The server transmits a connection request packet to the device in reply to the notice packet when a transfer to the device is requested from the terminal. The device transmits a TCP connection request to the server when receiving the connection request packet from the server. The server accepts the TCP connection request transmitted from the device to the server in reply to the connection request packet, to establish the TCP connection. Thus, the server transfers communications between the terminal and the device on the TCP connection after the TCP connection is established.

27 Claims, 9 Drawing Sheets

U.S. PATENT DOCUMENTS

| | | | |
|---|---|---|---|
| 5,941,988 A * | 8/1999 | Bhagwat et al. | 726/12 |
| 6,006,259 A * | 12/1999 | Adelman et al. | 709/223 |
| 6,012,090 A * | 1/2000 | Chung et al. | 709/219 |
| 6,055,236 A * | 4/2000 | Nessett et al. | 370/389 |
| 6,081,837 A * | 6/2000 | Stedman et al. | 709/219 |
| 6,104,716 A | 8/2000 | Crichton et al. | |
| 6,163,532 A * | 12/2000 | Taguchi et al. | 370/338 |
| 6,170,057 B1 * | 1/2001 | Inoue et al. | 713/153 |
| 6,304,915 B1 * | 10/2001 | Nguyen et al. | 709/250 |
| 6,389,462 B1 * | 5/2002 | Cohen et al. | 709/218 |
| 6,473,406 B1 * | 10/2002 | Coile et al. | 370/248 |
| 6,515,974 B1 * | 2/2003 | Inoue et al. | 370/331 |
| 6,557,037 B1 * | 4/2003 | Provino | 709/227 |
| 6,591,306 B1 * | 7/2003 | Redlich | 709/245 |
| 7,068,655 B2 * | 6/2006 | March et al. | 370/392 |
| 2001/0029547 A1 * | 10/2001 | Kano et al. | 709/238 |
| 2001/0051902 A1 * | 12/2001 | Messner | 705/26 |
| 2002/0052968 A1 * | 5/2002 | Bonefas et al. | 709/231 |
| 2002/0077105 A1 | 6/2002 | Chang | |
| 2002/0111996 A1 * | 8/2002 | Jones et al. | 709/203 |
| 2003/0018917 A1 * | 1/2003 | Brown | 713/201 |
| 2004/0024879 A1 * | 2/2004 | Dingman et al. | 709/227 |

OTHER PUBLICATIONS

Gourley D et al., "HTTP: The Definitive Guide," Sep. 2002, O'Reilly, Chapter 4.5.1-4.5.9.*

Rosenberg et al., "SIP Extension for NAT Traversal," IETF, Internet Draft, draft-ietf-sip-nat-00.txt, pp. 1-14, (Aug. 28, 2001).

A publication by J. Rosenberg et al., entitled "SIP Traversal through Residential and Enterprise NATs and Firewalls," Internet, Mar. 2, 2001, http://www.watersprings.org/pub/id/draft-davies-fw-nat-traversal-00.txt, downloaded on Jun. 20, 2003.

* cited by examiner

Fig.3A

NOTICE UDP PACKET
(ON LAN)

| SA=192.168.1.2 |
|---|
| DA=4.17.168.6 |
| SP=1 |
| DP=80 |
| PAYLOAD (DEVICE ID) |

Fig.3B

NOTICE UDP PACKET
(ON WAN)

| SA=202.224.159.142 |
|---|
| DA=4.17.168.6 |
| SP=100 |
| DP=80 |
| PAYLOAD (DEVICE ID) |

Fig.3C

CONNECTION REQUEST
UDP PACKET
(ON WAN)

| SA=4.17.168.6 |
|---|
| DA=202.224.159.142 |
| SP=80 |
| DP=100 |
| PAYLOAD (SESSION IDENTIFIER) |

Fig.3D

CONNECTION REQUEST
UDP PACKET
(ON LAN)

| SA=4.17.168.6 |
|---|
| DA=192.168.1.2 |
| SP=80 |
| DP=1 |
| PAYLOAD (SESSION IDENTIFIER) |

Fig.4

| DEVICE ID | SA | DA | SP | DP | LAST ACCESS TIME |
|---|---|---|---|---|---|
| 1234 | 202.224.159.142 | 4.17.168.6 | 100 | 80 | 2002/10/10 14:00.00 |
| ... | ... | ... | ... | ... | ... |
| | | | | | |

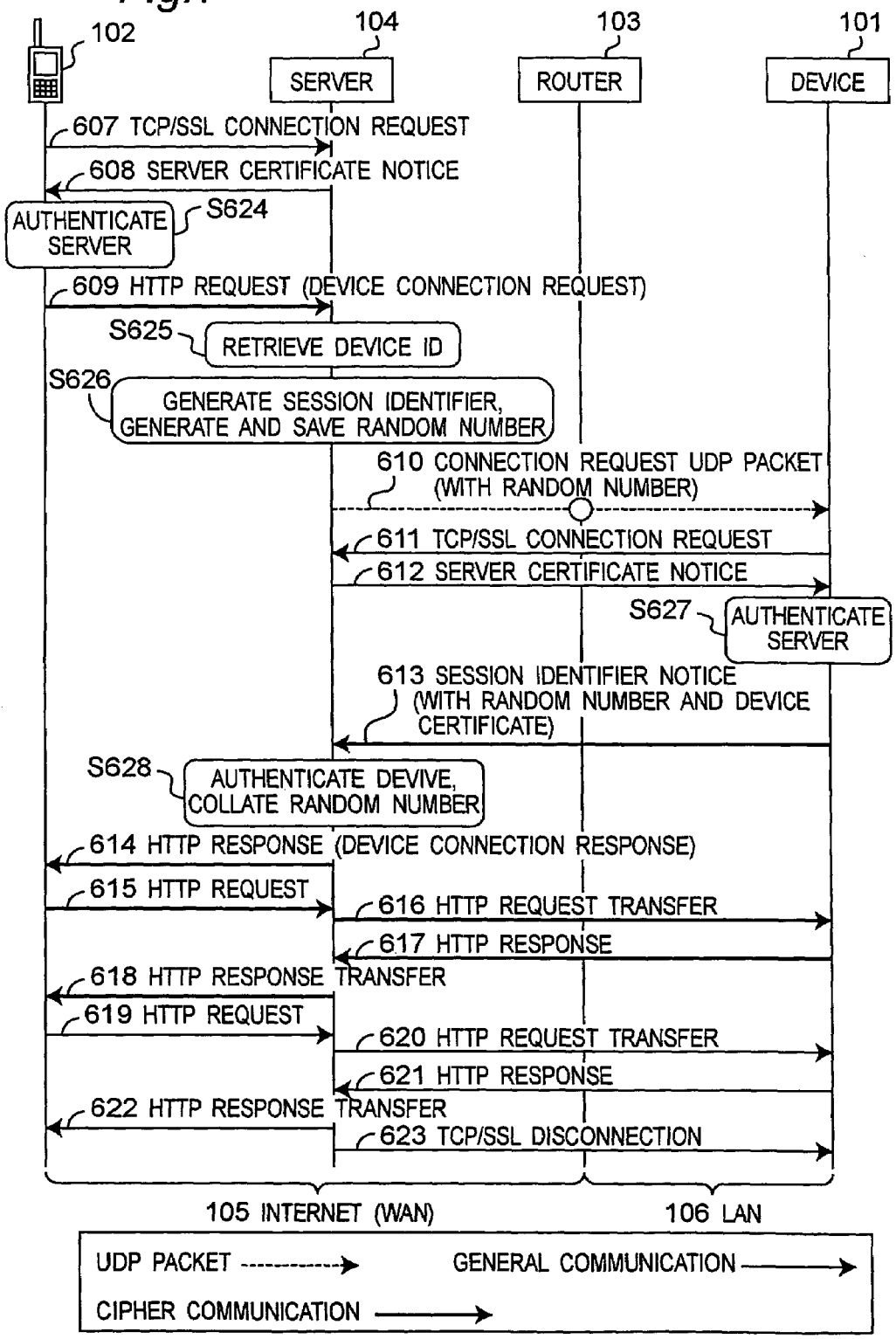

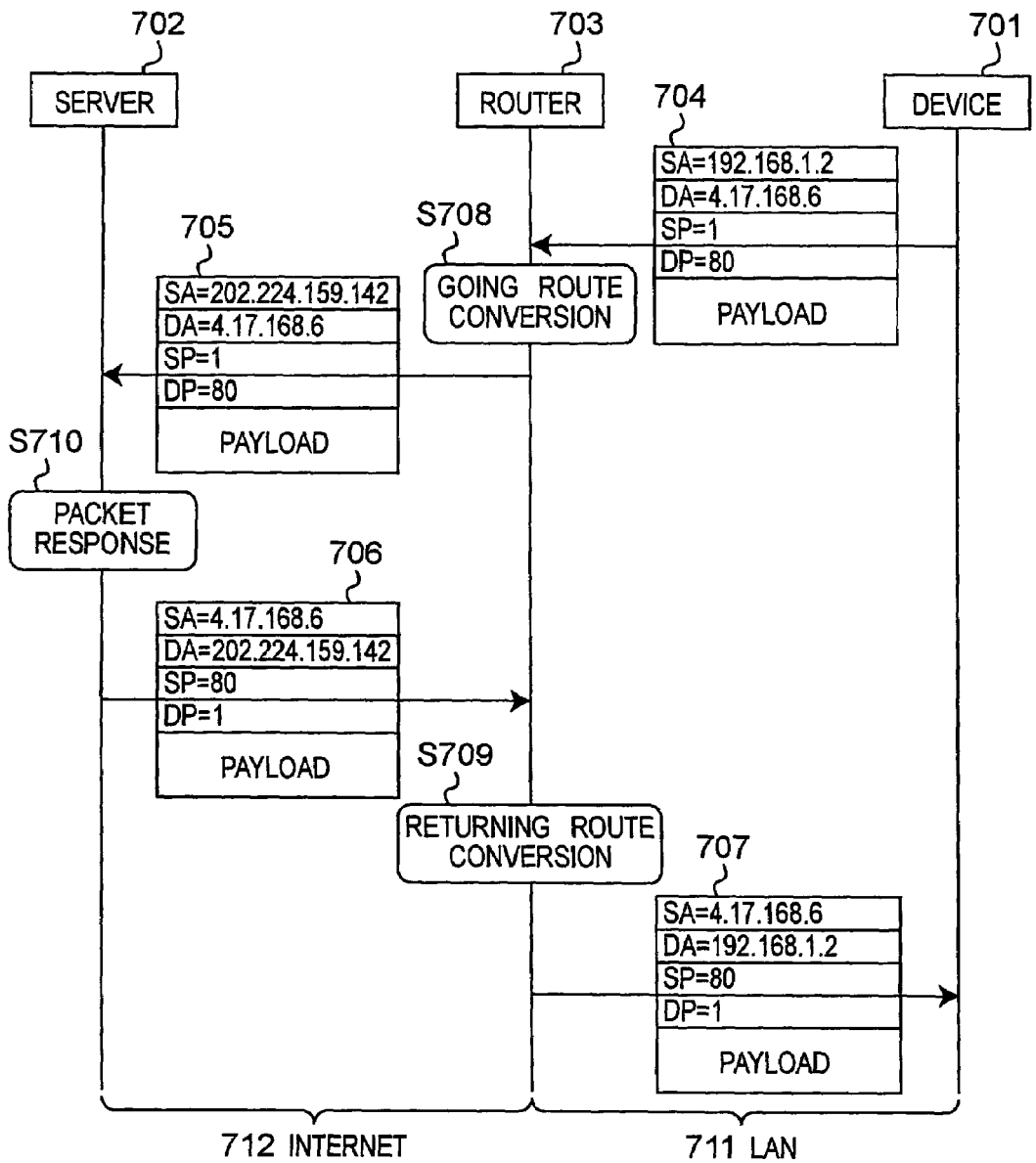

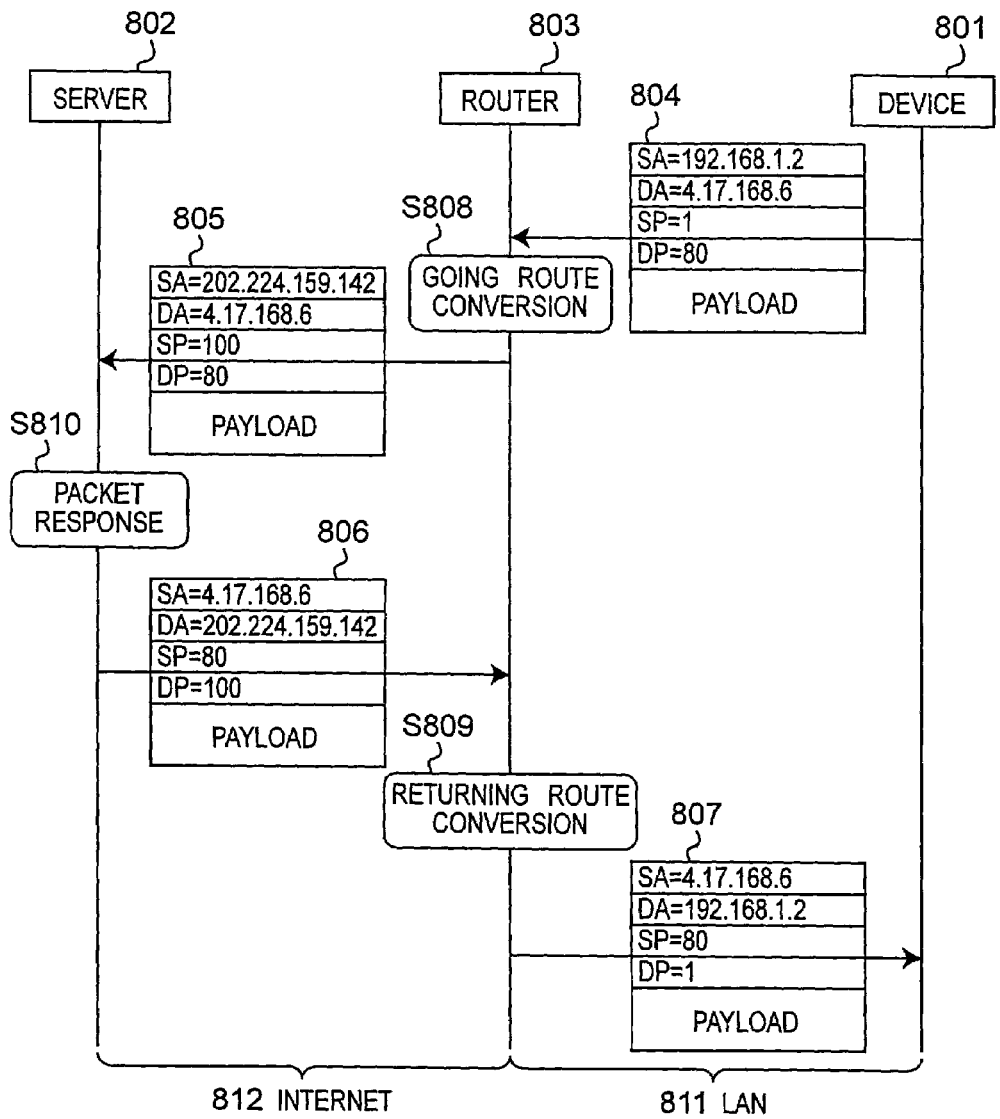

SECURED TCP/IP COMMUNICATION SYSTEM FOR DEVICES AND PRIVATE NETWORKS CONNECTED TO THE INTERNET

TECHNICAL FIELD

The present invention relates to a communication system employing an IP protocol, and more particularly to a communication system capable of starting communication to a device in a local area network by way of a router at a specified timing from a device on the Internet.

BACKGROUND ART

Recently, whether in office or at home, a local area network (LAN) and the Internet are generally connected by way of a router having a network address translation function (NAT) or network address port translation function (NAPT).

To communicate between devices connected to the Internet, global IP addresses assigned uniquely around the world are employed. On the other hand, owing to the rapid increase in the number of devices connected to the Internet, the global IP addresses tend to be in shortage. Accordingly, in the LAN of an organization or household not connected to the Internet directly, it is general to use private IP addresses which are unique only within a LAN specified by RFC1918. Private IP addresses are not unique on the Internet, and thus a device having a private IP address cannot communicate with a device connected to the Internet in this state. This problem is solved by the NAT or NAPT function, which can present mutual conversion functions of global IP addresses and private IP addresses so that the devices assigned with the private IP addresses can communicate via the Internet.

The mechanism of NAT function is explained below by referring to a communication sequence diagram in FIG. 8A. A LAN 711 is connected to the Internet 712 by way of a router 703. A device 701 is connected to the LAN 711, and a server 702 is connected to the Internet 712. An IP address of the device 701 is a private IP address "192.168.1.2" and an IP address of the server 702 is supposed to be a global IP address "4.17.168.6." An Internet side address of the router 703 is a global IP address "202. 224.159.142." For the sake of explanation, there is only one Internet side address of the router 703.

In this network configuration, to start communication with the server 702, the device 701 first sends an IP packet 704 to the LAN 711. In order to specify the destination of transmission and reception, the IP packet 704 includes fields for holding source IP address (SA), destination IP address (DA), source port (SP), and destination port (DP), and a payload for carrying desired information.

The router 703 detects that the destination of the IP packet 704 is global IP address "4.17.168.6," and performs going route conversion 708 of the IP packet 704 to transfer it to the Internet 712 as IP packet 705. In going route conversion 708, private IP address "192.168.1.2" in SA field of the IP packet 704 is replaced with the Internet side global IP address "202.224.159.142" of the router 703. At this time, the router 703 stores a set of SA "192.168.1.2" of IP packet 704 and DA "4.17.168.6" of IP packet 705 in NAT table 713 held inside of the router 703 as shown in FIG. 8B.

As a result of conversion 708, the IP packet 705 becomes a packet which can be transferred on the Internet, including only the global IP address. Accordingly, the IP packet 705 is transferred to the intended server 702, and the packet response is processed (S710) in the server 702, and the IP packet 706 of response is returned to the router 703. In the packet response process (S710), the values of SA and DA of the packet are exchanged.

When receiving the IP packet 706, the router 703 compares it with the NAT table 713. As a result of comparison, the DA of the IP packet 706 coincides with the SA of the IP address 705, and it is confirmed to be the response to the packet sent out from the router 703, and returning route conversion 709 is conducted.

In returning route conversion 709, the router 703 replaces the global IP address "202. 224.159.142" in the DA field of the IP packet 706 with the IP address "192.168.1.2" of the device 701 stored in the NAT table 713 on the basis of the IP address "4.17.168.6" in the SA field of the IP packet 706, and transfers it to the LAN 711 as IP packet 707. As a result, the IP packet 707 is transmitted to the device 701, and is received in the device 701 as the response of the IP packet 704.

The NAT table 713 is held during communication, and is discarded when the communication is over. End of communication is usually judged by detection of the syn packet or time out determined by a period for which no communication is made in the case of TCP packet. In case of the UDP packet, it is usually judged by time out. Thus, communication is enabled between the server 702 on the LAN and the device 701 on the Internet.

Thus, by the router having the NAT function, communication between a device on the LAN and a device on the Internet is enabled. However in the mechanism of the NAT, in order that a plurality of devices on the LAN can communicate simultaneously with the devices on the Internet, the NAT router must be assigned with as many global IP addresses as the number of devices to communicate simultaneously, and the reducing effect of global addresses becomes smaller. To solve such problem, the NAPT function is developed by extending the function of the NAT.

The mechanism of the NAPT function is explained by referring to the communication sequence diagram in FIG. 9A. Explanation of the same operation as in the NAT in FIG. 8A is omitted. In the NAT, only the IP address of the IP packet is converted, but in the NAPT, the port is converted at the same time. That is, in going route conversion 808 in FIG. 9A, in addition to the same converting process as in the NAT, a port number not used by a router 803 at the present is selected (herein "100"), and it is replaced with the SP (herein "1") of an IP packet 804, and is converted into an IP packet 805. At this time, the router 803 stores a set of SP (1) of IP packet 804 and replaced port (100) of the router 803 in NAPT table 813 (see FIG. 9B) in the router 803, in addition to a set of SA "192.168.1.2" of IP packet 804 and DA "4.17.168.6" of IP packet 805.

When receiving the IP packet 806, the router 803 compares the content of the reception packet and the table 813. As a result of comparison, if the DA of the received IP packet 806 coincides with the SA of the IP address 805, and the DP of the IP packet 806 coincides with the SP of the IP address 805, then it is confirmed that the received packet 806 is the response to the packet 805 sent out from the router 803. Hence returning route conversion 809 is conducted. In returning route conversion 809, in addition to the operation of the NAT, the content of the DP (herein "100") of the IP packet 806 is replaced with the SP (herein "1") of the saved IP packet 804, and is converted to the IP packet 807. As a result, communication is enabled between the device 801 on the LAN 811 and the server 802 on the Internet 812. According to the NAPT function, when a plurality of devices communicate simultaneously from the LAN side, communications from the device 801 can be distinguished by the port numbers of the router, and therefore even though there is only one global IP address of the router 803, communications can be done simultaneously by the same number of the ports of the router.

In this way, according to the NAT or NAPT technology, it is easy to connect from the device in the LAN having a private IP address to the server on the Internet. On the other hand, it is not easy to connect freely from the device on the Internet whenever desired to the device in the LAN having a private IP address, and hence it was difficult to realize such a function as to control by connecting to electric home appliances at home from a cellular phone via the Internet. This is because the device in the LAN has a private IP address and a packet cannot be sent to the private IP address from the device on the Internet. To solve this problem, a function called static NAT or port forwarding is proposed.

In the static NAT function, the user has to set a static NAT table in the router in advance. The entry of the static NAT table consists of IP address and port of the device in the LAN desired to be connected, and an arbitrary vacant port of the router. When desiring to connect to a device in the LAN from the Internet, the user designates a set of global IP address of the router and a port preset in the static NAT table from the user's terminal to transmits a packet. The router compares the content of the packet received from the user's terminal with the entry of the preset static NAT table, and replaces the transmission destination of the packet with the IP address and port of the device in the LAN in the entry to transfer it.

By such static NAT, it is enabled to communicate from the device on the Internet to a device in the LAN. In the static NAT, however, the user must set a static NAT table beforehand, and the content of this setting is complicated for the end user not having the knowledge of IP address. Besides, if the global IP of the router is dynamically assigned by the PPP or DHCP protocol, it is hard for the user to understand the addresses, and the destination of connection cannot be specified. Still more, the security is lowered because an external packet is transferred into the LAN. Further, if the router managed by the user is connected to the network of the private address of ISP, that is, when there are multiple stages of NATs, then communication from the Internet is not enabled unless the static NAT of the router of the ISP is set. As such there were many problems.

As explained herein, although it is easy to connect from a device in the LAN having a private address to a device on the Internet, it was not easy to connect to a device in the LAN having a private IP address from a device on the Internet when desired. It was hence difficult to realize such a function as to control by connecting to a personal computer (PC) or electric appliance at home from a PC or cellular phone via the Internet.

SUMMARY OF THE INVENTION

It is hence an object of the invention to solve the above problems. That is, the invention provides a method of communicating freely whenever desired from a device on the Internet to a device in a LAN having a private IP address. In particular, the invention provides a communication method which does not need complicated setting in the router beforehand by the user, can designate easily destination communication devices even if the Internet side address of the router is assigned dynamically, and can realize the communication described above with multiple stages of NAT routers.

A first communication system of the invention is a communication system for transferring communications between at least one device connected to the Internet, and at least one terminal which can be connected to the Internet, by way of a server connected to the Internet. In the communication system, the server and device operate as follows.

The device transmits a notice packet periodically to the server, and the server, when transfer is requested from the terminal to the device, sends a connection request packet to the device in reply to the notice packet. The device transmits a TCP connection request to the server when receiving the connection request packet from the server. The server accepts the TCP connection request transmitted from the device to the server in reply to the connection request packet, and thereby establishes the TCP connection. The server transfers communications between the terminal and the device on the TCP connection after the TCP connection is established.

According to the first communication system, since the connection request packet transmitted from the server to the device is transmitted as response to the notice packet from the device, even if the device is connected to the Internet by the router having the NAT function, the connection request packet can be sent up to the device over the router without static NAT setting. Moreover, when the TCP connection is established, since connection is requested from the device to the server, the TCP connection can be established without static NAT setting. Accordingly, TCP connection can be established between the server and the device whenever desired, and as the server transfers communication on this TCP connection, it is possible to communicate from the terminal to the device connected to the LAN whenever desired regardless of presence or absence of NAT router. In the invention, further, a packet of light load is used in a period not transferring communication, and TCP connection of high reliability of communication is used in a period of transfer of communication, so that a reliable communication is realized while lessening the load of the server.

In a second communication system of the invention, the server and others operate as follows in the first communication system. The terminal requests transfer to the device by transmitting, to the server, an HTTP request including a device ID. The server, when transferring communication between the terminal and the device, transmits the HTTP request from the terminal onto the TCP connection extended from the device. The device processes the transferred HTTP request, and sends a corresponding HTTP response to the server on the TCP connection. The server transfers the HTTP response to the terminal. According to the second communication system, it is possible to communicate from the terminal having an existing Web browser to the device connected to the LAN, whenever desired, regardless of presence or absence of the NAT router, by means of HTTP.

In the second communication system, the device may have a Web server module and a transfer module. The Web server module receives an HTTP request from the transfer module, and sends back an HTTP response. The transfer module, when receiving a connection request packet from the server, transmits a TCP connection request to the server to establish the TCP connection, receives an HTTP request from the server on the TCP connection to transfer it to the Web server, and receives an HTTP response from the Web server, and transfers it to the server on the TCP connection.

According to this operation, it is possible to communicate from the terminal having an existing Web browser to the device connected to the LAN, whenever desired, regardless of presence or absence of the NAT router, by means of HTTP, and further the existing Web server module can be installed in the device.

In a third communication system of the invention, the server and others operate as follows in the first communication system.

The server can receive a plurality of transfer requests from at least one terminal, generates individual unique session identifiers corresponding to transfer requests when a plurality of transfer requests are made from the terminal to the device, and notifies the device by the connection request packet. The device, when receiving a connection request packet accompanied by a session identifier from the server, establishes the TCP connection to the server, transmits the session identifier to the server on the established TCP connection, and communicates with the server on the TCP connection after the TCP connection is established. The server accepts the TCP connection request sent from the device to the server in reply to the connection request packet to establish the TCP connection, receives the session identifier sent from the device on the established TCP connection, makes the received session identifier to correspond the TCP connection, and thereby makes a plurality of TCP connections correspond to a plurality of connection requests from the terminal. The server transfers the communication from the terminal on the established TCP connection, only when the terminal requests connection by designating the session identifier and the TCP connection corresponding to the designated session identifier has been already established, thereby transferring the communication contents in parallel in each session identifier.

According to the third communication system, a plurality of TCP connections can be established between the server and the device, and by managing the communication contents on the individual TCP connections by individual session IDs, it is possible to communicate from the terminal to the device in parallel in every session ID without disturbing the contents or sacrificing the uniformity.

In the first communication system, the server may include a storage section that stores the final access time of each device in a plurality of devices, and may operate as follows. When receiving a periodic notice packet from the device, the server updates the final access time by the reception time of the notice packet. When transfer to the device is requested from the terminal, the server rejects the connection request if the difference between the final access time of the device and the present time is over a specified period. It transmits the connection request packet to the device in reply to the notice packet if the difference is within the specified period.

Accordingly, it is immediately known that the device starts operation and is ready to communicate, when connection is requested from the terminal to the server. Hence, rejection to the terminal can be replied at high speed if unable to communicate. Since the IP address of the device is dynamically assigned by the ISP, even if the IP address of the device registered in the server has been already assigned in a different device due to power failure of the device or the like, wrong request of connection to the different device can be avoided.

In a fourth communication system of the invention, the server and others operate as follows in the first communication system.

The server includes a storage section that stores the final access time of each device in a plurality of devices. The server transmits maximum access acknowledge period information in advance to the device. The device receives the maximum access acknowledge period information to store it inside, and transmits a notice packet periodically in a shorter period than the period indicated by the maximum access acknowledge period information. When the notice packet is received from the device, the server updates the final access time by the reception time of the notice packet. When transfer to the device is requested from the terminal, the server rejects the connection request if the difference between the final access time of the device and the present time is over the period indicated by the maximum access acknowledge period information, and transmits the connection request packet to the device in reply to the notice packet if the difference is within the period indicated by the maximum access acknowledge period information.

According to the fourth communication system, it is immediately known that the device starts operation and is ready to communicate when connection is requested from the terminal to the server, and rejection to the terminal can be replied at high speed if unable to communicate, and the IP address of the device is dynamically assigned by the ISP, and if the IP address of the device registered in the server has been already assigned to a different device due to power failure of the device or the like, wrong request of connection to the different device can be avoided. Moreover, by designating the maximum access acknowledge period information in advance from the server to the device, the transmission period of the notice packet for confirming that the device is ready to communicate can be controlled, and the reception load of the notice packet in the server and the time until detecting incapability of communication can be freely adjusted by tradeoff.

In a fifth communication system of the invention, the server and others operate as follows in the first communication system.

The server includes a cipher communication section that holds server certificate and encrypts and decrypts the communications. The terminal includes a verification section that verifies server certificate and a cipher communication section that encrypts and decrypts the communications. The device includes a cipher communication section that encrypts and decrypts the communications. The server transmits the server certificate in advance to the terminal when transferring confidential information between the terminal and the device. The terminal validates the server certificate, and then encrypts confidential information by the cipher communication section if the certificate is authentic for transmission and reception of the confidential information. The device encrypts the confidential information with the server by the cipher communication section on the established TCP connection, for transmission and reception of the confidential information. The server receives encrypted confidential information from the terminal, decrypts the received information by the cipher communication section, and encrypts the decrypted information by the cipher communication section to transmit the information to the device when transferring the confidential information from the terminal to the device through the established TCP connection. It also receives encrypted confidential information from the device, decrypts the information by the cipher communication section, and encrypts the decrypted information by the cipher communication section to transmit the encrypted information to the terminal, when transferring the confidential information from the device to the terminal through the TCP connection established by the device.

According to the fifth communication system, confidential communication is possible between the terminal and the device, and the server certificate for validating the connection destination from the terminal is not required in the individual devices, and only one type is needed in the server.

In a sixth communication system of the invention, the server and others operate as follows in the first communication system.

The server includes a cipher communication section that holds server certificate and encrypts and decrypts the communications. The terminal includes a verification section that verifies the server certificate and a cipher communication section that encrypts and decrypts the communications. The device includes a verification section that verifies the server certificate and a cipher communication section that encrypts and decrypts communications. The server transmits the server certificate in advance to the terminal and the device individually when transferring confidential information between the terminal and the device. The terminal validates the server certificate, and if the certificate is authentic, it encrypts the confidential information by it's cipher communication section to transmit and receive the confidential information with the server. The device validates the server certificate, and if the certificate is authentic, it encrypts the confidential information by it's cipher communication section to transmit and receive the confidential information with the server on the TCP connection established by the device. The server receives encrypted confidential information from the terminal, decrypts the received information by it's cipher communication section, and encrypts the decrypted information by it's cipher communication section to transmit the encrypted information to the device when transferring the confidential information from the terminal to the device through the TCP connection established by the device. It also receives encrypted confidential information from the device, decrypts the received information by it's cipher communication section, and encrypts the decrypted information by the cipher communication section to transmit the encrypted information to the terminal, when transferring the confidential information from the device to the terminal through the TCP connection established by the device.

According to the sixth communication system, confidential communication is possible between the terminal and the device, and the server certificate for validating the connection destination from the terminal is not required in the individual devices, and only one type is needed in the server.

A seventh communication system of the invention is a communication system for transferring communications between at least one device connected to the Internet, and at least one terminal which can be connected to the Internet, by way of a server connected to the Internet. In this communication system, the server and others operate as follows.

The server includes a storage section that stores the final access time in each device in a plurality of devices. The device transmits first and second notice packets periodically to the server, and the transmission period of the first notice packet is longer than the transmission period of the second notice packet. The server receives the first and second notices packets from the device, and updates the final access time by the reception time when receiving the first notice packet from the device, but does not update the final access time when receiving the second notice packet from the device. The server rejects the connection request if the difference between the final access time of the device and the present time is over a specified period when transfer to the device is requested from the terminal. It transmits the connection request packet to the device in reply to the first and second notice packets if the difference is within the specified period. The device transmits a TCP connection request to the server when receiving the connection request packet from the server. The server accepts a TCP connection request transmitted from the device to the server in reply to the connection request packet, thereby establishing the TCP connection. The server transfers communications between the terminal and the device on the TCP connection after the TCP connection is established.

According to the seventh communication system, it is immediately known that the device starts operation and is ready to communicate, when connection is requested from the terminal to the server, and thus rejection to the terminal can be replied rapidly if unable to communicate. The IP address of the device is dynamically assigned by the ISP, and thus wrong request of connection to the different device can be avoided even if the IP address of the device registered in the server has been already assigned to a different device due to power failure of the device or the like. Further, according to the invention, the notice packet is classified into first and second notice packets, and updating of the final access time is limited at reception of the first notice packet only. Thus, the response time for the NAT router to recognize the connection request packet to be response to the notice packet becomes shorter, and therefore even if required to enhance the communication frequency of the notice packet, it is not needed to enhance the frequency of updating of final access time which is high in load for the server.

The functions of the server and device in the communication system can be realized by executing a specified program by a programmable apparatus such as computer. Such program may be presented in a recording medium which can be read by a computer.

The invention provides, as explained herein, a method capable of communicating freely with the device in the LAN having a private IP address from the device on the Internet, and the user does not have to make complicated setting on the router beforehand. The invention further provides a method capable of designating the communication destination function easily even if the Internet side address is dynamically assigned in the router, and also capable of operating when there are multiple stages of NAT routers. At this time, the low server load by the UDP packet and high reliability of communication between the terminal and device by TCP packet can be realized at the same time.

Not making static NAT, it is resistant to attack from third party and is high in security, and also easy in adjustment of server communication load, and a widely versatile and easy-to-use communication system employing the terminal implemented with an ordinary Web browser and HTTP communication can be achieved at a low cost, and many other outstanding effects are obtained.

BRIEF DESCRIPTION OF DRAWINGS

FIG. 3A is a diagram showing contents of notice UDP packet on LAN in the communication system of the invention.

FIG. 3B is a diagram showing contents of notice UDP packet on WAN in the communication system of the invention.

FIG. 3C is a diagram showing contents of connection request UDP packet on WAN in the communication system of the invention.

FIG. 3D is a diagram showing contents of connection request UDP packet on LAN in the communication system of the invention.

FIG. 4 is a diagram showing an entry including device ID, addresses of SA, DA and others, and final access time registered in the server in the communication system of the invention.

FIG. 7 is a diagram showing communication sequence in embodiment 3 of the invention.

FIG. 8A is a diagram showing communication sequence of router having NAT function in a prior art.

FIG. 8B is a diagram showing NAT table.

FIG. 9A is a diagram showing communication sequence of router having NAPT function in a prior art.

FIG. 9B is a diagram showing NAPT table.

BEST MODE FOR CARRYING OUT THE INVENTION

Referring now to the accompanying drawings, preferred embodiments of the communication system of the invention are described in detail below.

FIRST EMBODIMENT

Figure 1:
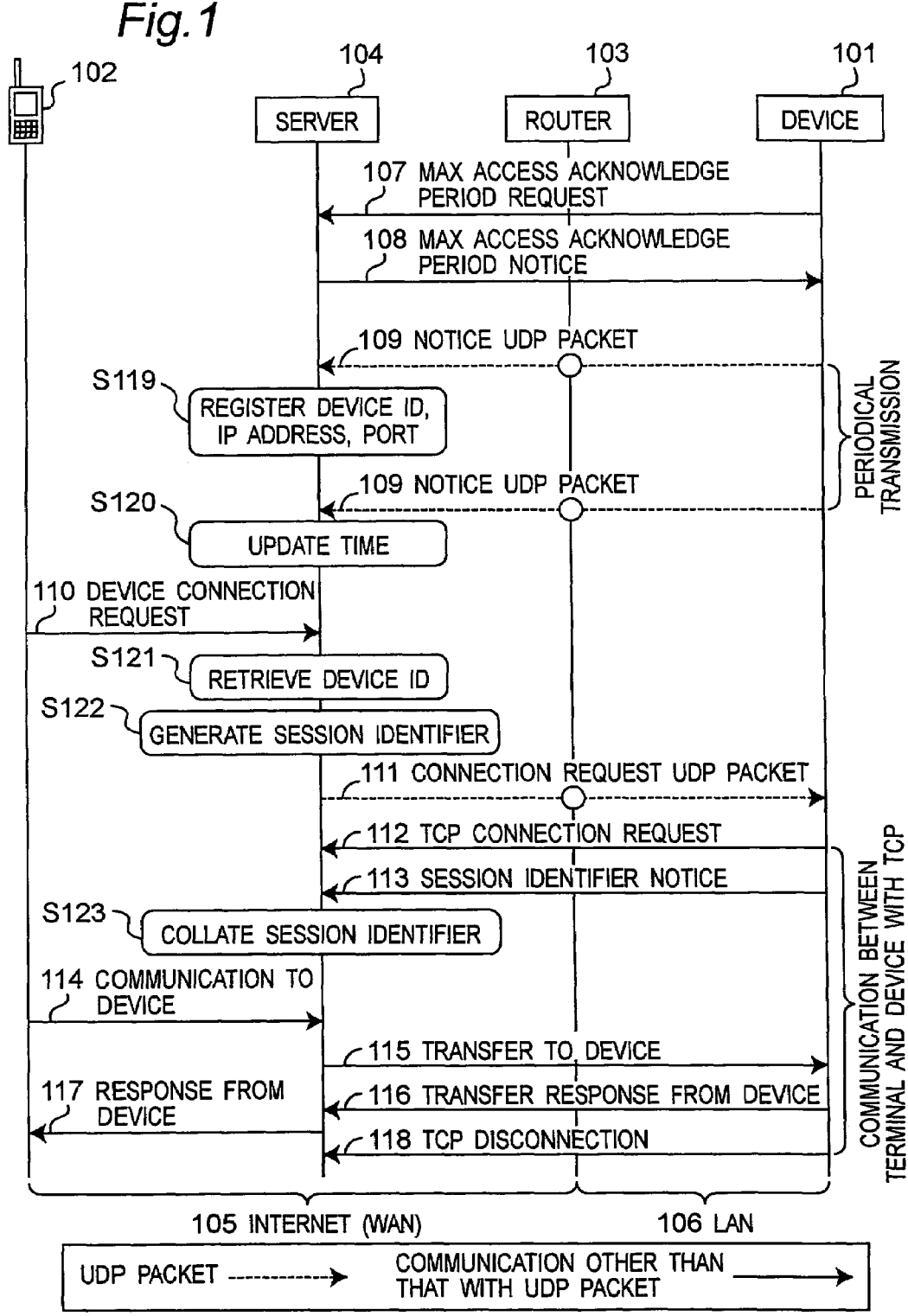
FIG. 1 is a diagram showing communication sequence in embodiment 1 of the invention.
Figure 2:
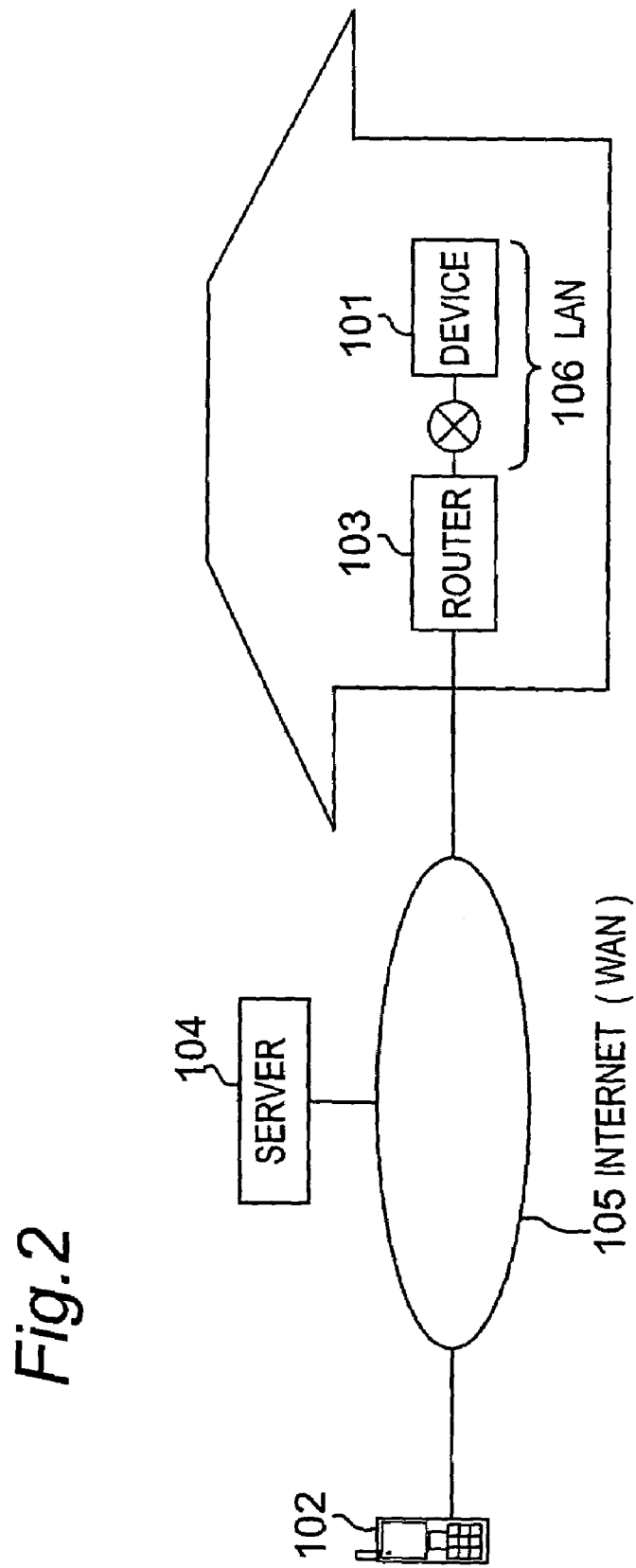
FIG. 2 is a diagram showing network connection in the communication system of the invention.

FIG. 1 is an explanatory diagram of communication sequence in communication system according to the first embodiment of the invention. FIG. 2 is a network connection diagram of communication system of the invention. The communication system of the invention realizes communication between a device on a local area network (LAN) 106 and a device on the Internet 105, including a device 101 connected to the LAN 106, a server 104 connected to the Internet 105, and a router 103 connecting the LAN 106 with the Internet. A communication terminal 102 is also connected to the Internet 105.

The router 103 is implemented with a function of NAPT. Suppose the IP address of the device 101 to be a private IP address "192.168.1.2", and the IP address of the server 104 to be a global IP address "4.17.168.6." The Internet 105 side address of the router 103 is assigned by the protocol such as DHCP or PPP from the Internet service provider, and changes dynamically, and at this moment the Internet side address of the router 103 is supposed to be a global IP address "202.224.159.142." For the sake of explanation, assume there is only one Internet 105 side address of the router 103. In the embodiment, the IP address conforms to the IP ver. 4.

Referring to FIG. 1, the communication sequence of the embodiment is explained.

The device 101 first transmits a maximum access acknowledge period information request 107 to the server 104. As the response to it, the server transmits a maximum access acknowledge period information notice 108. These communications 107 and 108 may be made via either the UDP or the TCP. These are started from the device 101 connected to the LAN 106 side, and hence it is possible to communicate without problem over the router 103 having the NAPT function. Herein, the maximum access acknowledge period shows the maximum value of the transmission time interval of the notice UDP packet (described below) transmitted from the device 101 to the server 104, the value of which is, for example, 5 minutes.

The device 101 transmits notice UDP packet 109 periodically. This transmitting period is shorter than the value (for example, 5 minutes) of the maximum access acknowledge period obtained previously. The notice UDP packet 109 includes "a device ID" which is a device identifier individually given to the device 101. The notice UDP packet 109 undergoes the NAPT conversion of the going route by the router 103, and is sent out to the Internet 105, and is received in the server 104.

FIGS. 3A and 3B show contents of notice UDP packet before and after the conversion. The transmission period of notice UDP packet is set shorter than the time for the router 103 to discard the NAPT table of the UDP packet by expiration (time out). As a result, the NAPT table as shown in FIG. 9B is held in the router 103 continuously without expiration.

Return to FIG. 1, the server 104 receives notice UDP packet 109, and takes out the individual addresses SA, DA, SP, DP and the device ID in the header, and, as shown in FIG. 4, registers and stores these pieces of information in the server as a set of entry corresponding to the device (device ID="234") 101 (step S119). At step S119, the final access time is added to the entry, and the time of the server 104 receiving the notice UDP packet 109 is recorded. Thereafter, the server 104 updates the final access time of the entry corresponding to the device as shown in step S120 every time receiving notice UDP packet 109. At this time, if the addresses of SA, SP in the header of the notice UDP packet 109 have been changed, these address values in the entry are also updated. Hence, if the Internet (WAN) 105 side IP address of the router 103 is assigned dynamically, the latest address is held in the entry. By execution of the above sequence, preparation for communication is completed.

While the preparation for communication is thus complete, if desired to start communication to the device 101 from the terminal 102, the terminal 102 designates the device ID of the device 101 as the parameter, and transmits a device connection request 110 to the server 104. Suppose the device ID is preliminarily recognized by the terminal 102. When receiving the device connection request 110, the server 104 retrieves the device ID registered in the server from the table shown in FIG. 4, using the device ID designated by the terminal 102 as the retrieval key, and obtains the corresponding entry registered by the device 101 (step S121).

Next, the server 104 confirms the final access time in the entry, and rejects the device connection request 110 if the difference between the final access time and the present time is over the maximum access acknowledge period. When it is equal to or less than the maximum access acknowledge period, the control advances to step S122, the server 104 transmits a connection request UDP packet 111 to the device 101.

Thus, by confirming the final access time, it can be known that the device 101 is operating normally and checked if the communication has been normal up to the present or not, so that the acceptance or rejection of device connection request 110 can be judged immediately. Moreover, since the Internet (WAN) 105 side IP address of the router 103 is dynamically assigned by the ISP, when a certain time passes after the power source of the device 101 is cut off, the IP address of the device 101 registered in the server 104 may be assigned to other device, but even in such a case, connection request to a wrong different device can be prevented.

The server 104 generates a unique session identifier, and stores in the server (step S122). The server 104 further acquires each address of SA, DA, SP, DP from the entry corresponding to the device 101, and transmits the connection request UDP packet 111 having the session identifier included in the payload by using them. Herein, the connection request UDP packet 111 is composed as a response to the notice UDP packet 109. FIG. 3C shows the content of the connection request UDP packet sent out to the Internet (WAN) 105. The values of address and port of the packet shown in FIG. 3C are exchanged values of the source and destination values of the address and port in the packet shown in FIG. 3B, respectively. Accordingly, it is known that the connection request UDP packet 111 is a response packet of the notice UDP packet 109. The connection request UDP packet 111 is converted from the structure shown in FIG. 3C into a structure shown in FIG. 3D by NAPT conversion of the returning route in the router 103, and transferred to the device 101.

Receiving the connection request UDP packet 111, the device 101 transmits a TCP connection request 112 to the server 104. Detailed description about TCP connection request 112 is omitted, but it can be achieved by an ordinary TCP connection establishing procedure for establishing connection by syn, ack/syn, and ack packets. The TCP connection request 112 is demanded from the LAN side to the WAN side, and hence the TCP connection passing the router 103 having the NAPT function can be established without trouble.

In this way, the TCP connection is established between the server 104 and the device 101, but since the UDP packet is of connectionless type, it cannot be judged, in this state, whether the TCP connection has been established or not in response to the connection request UDP packet 111 in the server 104. Accordingly, the procedure explained below is executed.

First, the device 101 sends back the session identifier noticed by the connection request UDP packet 111 to the server by session identifier notice 113 on its TCP connection. When receiving the session identifier, the server 104 collates the session identifier at step S123. As a result of the collation, if this session identifier is verified to be generated by the device connection request 110, the server 104 determines to use this TCP connection in transfer of communication between the terminal 102 and device 101 in reply to the connection request 110.

Instead of the session identifier, by using the device ID, correspondence of the TCP connection and connection request UDP packet can be achieved, but the problem in this case is that a plurality of TCP connections cannot be established simultaneously between the server 104 and the device 101. According to the embodiment, a plurality of TCP connections can be established between the server 104 and the device 101, and by managing the communication contents on the individual TCP connections by individual session identifiers, communications can be achieved on the individual TCP connections while maintaining uniformity, without disorderly confusion of plural communication contents, and plural communications are possible in parallel in each session identifier from the terminal 102 to the device 101.

In this procedure, when the TCP connection is established between the server 104 and the device 101, the server 104 begins to transfer communication between the terminal 102 and the device 101 on the TCP connection. That is, the server 104 transfers a communication 114 from the terminal 102 to the device 101 as a communication 115, and transfers a communication 116 from the device 101 to the terminal 102 as a communication 117. Finally, when the communications are over, the server 104 or the device 101 performs the TCP disconnection 118, and the ordinary TCP connection is disconnected, and a series of sequence is terminated.

Transfer of communication by the server 104 can be repeated as many times as desired as far as the TCP connection is maintained, and a series of communications can be made between the terminal 102 and device 101. FIG. 1 shows a mode in which the device 101 replies to the communication from the terminal 104, but not limited to this, transfer of communication of any type of protocols of any procedure can be executed while the TCP connection is maintained.

According to the embodiment, as explained herein, by sending the connection request UDP packet 111 as response to the notice UDP packet 109, it is possible to start communication freely at a desired timing from the terminal 102 on the Internet to the device 101 in the LAN having the private IP address. Therefore, for example, by using a cellular phone or PDA connected to the Internet as the terminal and using an electric home appliance connected to the LAN, such as video, television, air conditioner or refrigerator as the device, the electric home appliance at home can be freely manipulated from outside of the home.

In this embodiment, the router 103 requires only ordinary NAPT operation, and setting of static NAT or static NAPT is not needed. Thus the user does not have to make complicated setting on the router beforehand.

According to the embodiment, without static NAT setting on the router 103, packets which can reach up to the device 101 from the WAN side are limited to the packets transmitted from the server 104 during the period of the device 101 transmitting the notice UDP packet. Hence, interference from third party is prevented and the security is enhanced.

According to the embodiment, the notice UDP packet 109 is periodically transmitted from the LAN to the Internet. As a result, this packet acts as a so-called keep-alive packet to the router 103, thereby preventing the PPP or DHCP of WAN side connection of the router 103 from being disconnected from the ISP due to expiration of time, so that it is always ready to communicate from the Internet.

According to the embodiment, the duration of the transmission period of the notice UDP packet 109 can be changed by the maximum access acknowledge period information notice 108 from the server 104, and thus it is possible to adjust freely the trade-off between the reception load of the notice UDP packet 109 in the server and the time until detecting incapability of communication.

According to the embodiment, even if the WAN side IP address of the router 103 is dynamically assigned, since the latest WAN side IP address is registered in the server 104 periodically by the notice UDP packet 109, only by designating the device ID from the terminal 102, the device 101 can be easily designated to start communication.

In this embodiment, it is preferred to prepare for communication by the UDP communication which is low in load, and communicate between the terminal 102 and the device 101 by the TCP communication which is low in data loss and high in reliability. Accordingly, the load of the server 104 is lowered, and the reliability of communication between the terminal 102 and device 101 can be enhanced. The notice UDP packet 109 in the stage of preparation of communication must be sent out in an interval less than the expiration of the NAPT table of the router 103, and frequency of the transmission is high, and hence by using the UDP packet, the load saving effect is large, and since it is transmitted periodically, if there is some packet losses, they can be restored in next transmission and effects are small. Thus it is particularly beneficial by using the UDP packet.

The embodiment is explained about the NAPT, but even if the router 103 operates by the NAT, the sequence in FIG. 1 can operate normally without requiring any change in the operation of the device 101 and server 104. Also in the embodiment, if the user directly connects the device 101 to the Internet 105 without using the router having the NAT function, the sequence in FIG. 1 is possible without requiring any change in the operation of the device 101 and server 104. Further in the embodiment, even if the user subscribes to the ISP using a private IP address and is connected to the Internet through multi-stages of NAT routers including the user's router and the ISP router, ordinary NAT or NAPT operation is executed in the router of each stage, and hence the sequence in FIG. 1 can also operate normally without requiring any change in the operation of the device 101 and server 104.

Meanwhile, the address registration is not an essential function for the notice UDP packet, and the effect of the invention can be obtained if the address is registered by other means, but this is a particularly preferred configuration because the efficiency is excellent by using two packets, that is, the packet for registering the global IP address that requires periodic transmission and the packet for maintaining the NAT table.

The session identifier may be unique in a range in which the TCP connection corresponds uniquely to the TCP connection request 112, for example, it doesn't have to be unique in the server, and it is enough when it is unique when combined with the device ID.

In the embodiment, the address of IP ver. 4 is exemplarily explained, but even if the address of IP ver. 6 is used, the invention has the same effect as far as using the router and gateway that pass the packet from the LAN to the Internet and the response to this packet but do not pass the packet from the Internet to the LAN.

In the embodiment, the terminal 102 is shown in the drawing so as to directly being connected to the Internet. However, even if the terminal 102 is connected to the LAN, as far as communication is started from the terminal 102, there is no problem in communication to the server 104, and the effects of the invention are the same. Further, when the terminal 102 has the same function as the device 101, even if both the terminal 102 and device 101 are in the LAN, they can start communications mutually, and a completely symmetrical communication system can be composed.

In the embodiment, the connection destination from the device 101 is the server 104 only, and the server 104 transfers the communication between the terminal 102 and device 101, but when the address of the terminal 102 is noticed by connection request UDP packet 111, the device 101 can transmit the TCP connection request 112 directly to the terminal 102. In such configuration, the terminal 102 and device 101 can communicate directly, and the transfer load of the server 104 is lowered, and other effects are brought about.

In the embodiment, the server only transfers the communication of the terminal and the device, but the server itself can communicate with the device by using the TCP connection. In such configuration, the server presents communication function to the device for the terminal, and also presents services to the device such as setting and monitoring of the device and updating of the software.

In the embodiment, the device 101 and server 104 can be achieved by a computer. In this case, it is possible to create computer programs for executing the sequence in FIG. 1 individually in the device 101 and server 104, and they can be stored and distributed in recording media. Thus, by using a general-purpose computer, it is possible to realize communication from outside of the home.

SECOND EMBODIMENT

Another embodiment of the communication system of the invention is explained.

The network connection of this embodiment is same as shown in FIG. 2. The address assignment is same as in the first embodiment, and only the communication sequence is different. In this embodiment, the terminal is a PC or cellular phone having Web browser, and by using this, it is intended to communicate with the device 101 connected to the LAN by HTTP, and manipulate or acquire contents.

Figure 5:
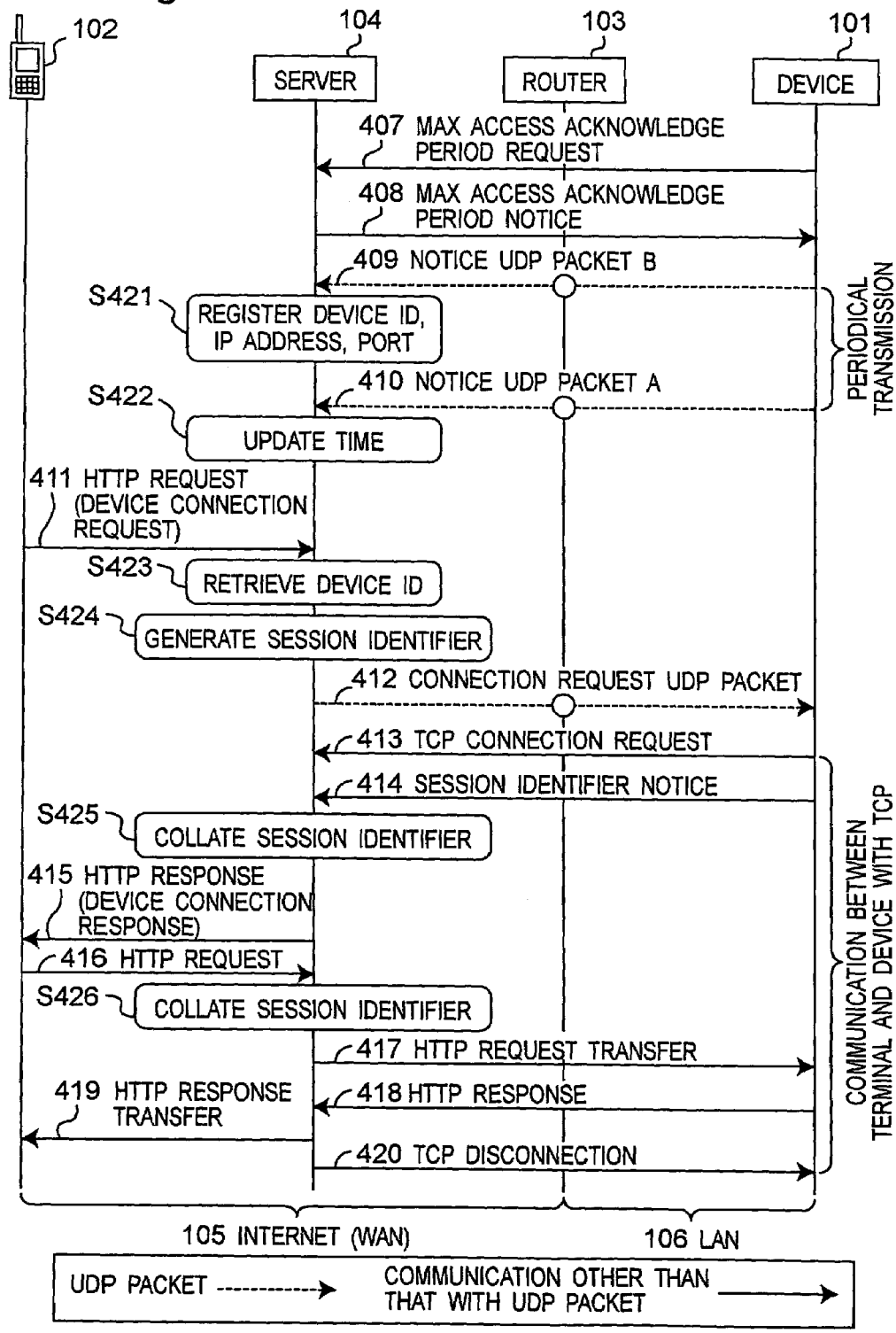
FIG. 5 is a diagram showing communication sequence in embodiment 2 of the invention.

Referring to FIG. 5, the communication sequence of this embodiment is described.

First, the device 101 transmits maximum access acknowledge period information request 407 to the server 104. In response to the request, the server 104 transmits maximum access acknowledge period information notice 408 to inform of the value (for example, 5 minutes) of maximum access acknowledge period. This communication may be made by either UDP or TCP, and since it is started from the device 101 connected to the LAN 106 side, the communication passing through the router 103 having the NAPT function is possible without problem.

Next, the device 101 transmits periodically two notice UDP packets A and B (410 and 409), respectively. The difference of two packets A and B is that the notice UDP packet A has a function of updating the final access time, while the notice UDP packet B does not have the function of updating the final access time. They are identical in other points.

The period of transmitting the notice UDP packet A (410) from the device 101 is shorter than the interval of the value (for example, 5 minutes) of maximum access acknowledge period obtained previously. On the other hand, the period of transmitting each the notice UDP packet A or B is set shorter than the time of discarding the NAPT table of the UDP packet due to expiration of time by the router 103.

In the first embodiment, there is only one type of notice UDP packet, and the transmission period must be set according to the shorter period of the condition above described. Accordingly, if the discarding time of the NAPT table of the router 103 is short (for example, 30 seconds), the notice UDP packet is transmitted at high frequency of period of 30 seconds or less, and the final access time is updated every transmission, and the entry is updated even if there is no change of address of the router 103 at the WAN side, and the server load is increased. In this embodiment, by contrast, the updating period of the final access time can be set independently regardless of the discarding time of the NAPT table of the router 103, so that the load can be reduced.

The notice UDP packets A and B include device ID which is a device identifier given individually to the device 101. The notice UDP packets A and B are sent out to the Internet after NAPT conversion of going route by the router 103, and received at the server 104. The NAPT conversion is same as in the first embodiment. It is also the same that the NAPT table in the router 103 is held continuously without expiring by the notice UDP packet, and also same as in the first embodiment, the address is registered for transmitting the packet to the device 101 upon entry in the server 104 (step S421), and the latest access time in the entry is updated (step S422). By execution of the sequence so far, the preparation for communication is completed.

While the preparation for communication is completed, when starting communication from the terminal 102 to the device 101, the terminal 102 specifies the device ID of the device 101 such as "GET connect.cgi? ID=1234" as a parameter to the server 104, and transmits device connection request 411 as HTTP request. Suppose the device ID "1234" is preliminarily recognized by the terminal 102. Receiving the device connection request 411, the server 104 searches for the device ID registered in the server with the designated device ID as a key to acquire the corresponding entry registered by the device 101, at step S423.

The server 104 consequently refers to the final access time (see FIG. 4) in the entry, and rejects the device connection request 411 if the difference between the final access time and the present time is over the maximum access acknowledge period. The control of the server 104 goes to step S424 if the difference is within the maximum access acknowledge period, so that the server 104 transmits connection request UDP packet 412 to the device 101. By checking the final access time, it is effective to avoid making wrong connection request to a different device by mistake, same as in the first embodiment.

At step S424, the server 104 generates a unique session identifier, and stores in the server 104. From the entry corresponding to the device 101, the server 104 acquires addresses of SA, DA, SP, DP, and transmits, by using them, the connection request UDP packet 412 having the session identifier included in the payload. Herein, the connection request UDP packet 412 is composed as response to the notice UDP packet A (410) or notice UDP packet B (409), and therefore the NAPT conversion of the returning route is conducted by the router 103, and the connection request UDP packet 412 is transferred to the device 101.

Receiving the connection request UDP packet 412, the device 101 transmits TCP connection request 413 to the server 104. Detailed description about TCP connection request 413 is omitted, but it is an ordinary TCP connection establishing procedure for establishing connection by syn, ack/syn, and ack packets. The TCP connection request 413 is demanded from the LAN side to the WAN side, and hence the TCP connection can be established without trouble over the router 103 having the NAPT function.

In this way, the TCP connection is established between the server 104 and the device 101, and then the device 101 sends back the session identifier noticed from the connection request UDP packet 412 to the server 104 by the session identifier notice 414 through this TCP connection. When receiving the session identifier, the server 104 collates the session identifier, at step S425, and detects that this session identifier has been generated by the device connection request 411, therefore, the TCP connection to the device connection request 411 has been successfully established.

Afterwards, the server 104 transmits HTTP response 415 to the terminal 102 in reply to the HTTP request 411. This HTTP response 415 includes the HTML contents to be displayed in the terminal 102, and the HTML contents have session identifier "5678" embedded as link, button, etc such as "<A HREF="control.cgi?Session ID=5678& Target=deviceFunc.cgi & Param=abcd">link </A>." In this procedure, the page (image) corresponding to the device 101 is displayed at the terminal 102.

Next, when the user clicks the link in the displayed page, an HTTP request 416 including the session identifier such as "GET control. cgi? Session ID=5678 & Target=deviceFunc.cgi & Param=abcd" is generated, and transmitted to the server 104. When receiving the HTTP request 416, the server 104 starts up the designated control.cgi, and collates the session identifier "5678" (step S426). As a result of collation, if it is detected that the TCP connection of the session identifier of "5678" has been already established, the control.cgi of the server 104 converts the content of the HTTP request 416 to, for example, "GET deviceFunc.cgi?Param=abcd" and transfers onto the TCP connection as HTTP request transfer 417. Thus, the terminal 102 can transmit the HTTP request to the device 101.

In the communication transfer between the terminal and the device in the invention, by employing the conversion method as mentioned above, excellent effects are obtained, that is, the terminal can operate without modifying the existing Web browser at all, and the device can freely describe an HTML document for starting by designating a desired cgi such as "deviceFunc.cgi" on the device and a desired parameter such as "Param=abcd."

Receiving the HTTP request transfer 417, the device 101 sends back an HTTP response 418 as response. This operation is more specifically explained below by referring to FIG. 6.

Figure 6:
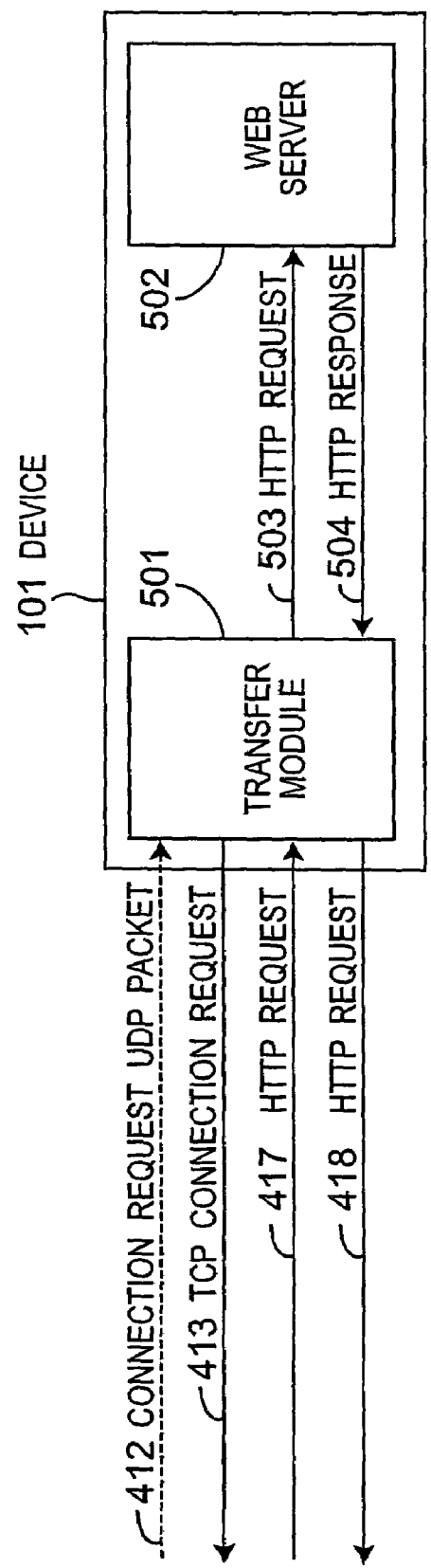
FIG. 6 is a diagram showing a configuration of device in the communication sequence in embodiment 2 of the invention.

As shown in FIG. 6, the device 101 includes a transfer module 501 and a Web server module 502. The transfer module 501 is a module for communicating with the server 104 through the communication protocol of the invention, and the Web server module 502 is an ordinary Web server. The transfer module 501, as mentioned above, receives the connection request UDP packet 412, sends a TCP connection request 413, and receives an HTTP request transfer 417. At this time, regarding the communication direction of the transfer module 501, the module 501 requests the TCP connection (413) while receives the HTTP request (417), and hence the direction of communication is different from the ordinary Web server which receives the HTTP request while requested with the TCP connection from the client. In this embodiment, the transfer module 501 absorbs this difference in direction. That is, the module 501 transmits internally the HTTP request 503 to the Web server module 502, and receives internally the HTTP response 504 from the module 502, through socket or the like. Therefore by using an ordinary Web server, the HTTP communication procedure of the invention can be realized.

Returning to FIG. 5, consequently, the server 104 sends back the HTTP response 418 to the terminal 102 as HTTP response transfer 419. In the HTML contents included in the HTTP response transfer 419, the session identifier is embedded as link or button, and repeating the same procedure as in steps 416 to 419 enables the terminal 102 access the device 101 consecutively by the HTTP. The HTML contents of the communication are generated in the device 101, and the contents display and manipulation are executed at the terminal 102, so that the device 101 can be manipulated freely or the contents can be acquired from the terminal 102.

Finally, when the communication is completed, the server 104 or the device 101 disconnects the TCP connection 420. Upon the TCP connection being disconnected, a series of sequence is finished.

According to the embodiment, as explained herein, same as in the first embodiment, to the device 101 in the LAN having a private IP address, communication can be started freely at a desired timing from the terminal 102 on the Internet. Hence, a device at home can be freely manipulated or contents can be acquired from the PC or cellular phone having the Web browser as the terminal.

Same as in the first embodiment, the router 103 requires only ordinary NAPT operation, and setting of static NAT or NAPT is not needed, and the user does not have to make complicated setting on the router beforehand.

Same as in the first embodiment, interference from third party is prevented and the security is enhanced.

Same as in the first embodiment, it is effective to prevent the PPP or DHCP of WAN side connection of the router 103 from being disconnected from the ISP due to expiration of time, so that it is always ready to communicate from the Internet.

Same as in the first embodiment, the reception load of the notice UDP packet A 410 in the server 104 and the time until detecting incapability of communication can be freely adjusted by trade-off.

Further, by preparing two notice UDP packets, that is, a packet having a function of updating the final access time and a packet not having such function, the above time adjustment can be done independently regardless of the discarding time of the NAPT table of the router 103.

Same as in the first embodiment, only by designating the device ID from the terminal 102, the device 101 can be easily designated to start communication.

Same as in the first embodiment, the load of the server 104 by the UDP packet can be reduced, and simultaneously the reliability of communication between the terminal 102 and device 101 by the TCP packet can be enhanced.

According to this embodiment, by using the terminal implemented with an ordinary Web browser as the terminal 102, the HTTP response is realized by mounting an ordinary Web server on the device 101, so that a communication system of high versatility and excellent ease of use by the user can be composed at a low cost.

The embodiment is explained about the NAPT, but if the router 103 operates with the NAT function, the communication sequence in FIG. 5 can be realized normally without requiring any change in the operation of the device 101 and server 104. Also in the embodiment, even if the user directly connects the device 101 to the Internet 105 without using the NAT router, the sequence in FIG. 5 can be realized without requiring any change in the operation of the device 101 and server 104. Further in this embodiment, if the user subscribes to the ISP using a private IP address and is connected to the Internet through multi-stages of NAT routers including the user's router and the ISP router, ordinary NAT or NAPT operation is executed in the router of each stage, and hence the sequence in FIG. 5 can also be realized normally without requiring any change in the operation of the device 101 and server 104.

Meanwhile, the address registration is not an essential function for the notice UDP packet, and the effect of the invention is obtained if the address is registered by other means, but this is a particularly preferred configuration because the efficiency is excellent by using two packets, that is, the packet for registering the global IP address and the packet for maintaining the NAT table, those packets requiring periodic transmission.

The session identifier is not particularly specified as far as the TCP connection corresponds uniquely to the HTTP request 411, for example, it doesn't have to be unique in the server, and it is enough when it is unique when combined with the device ID.

As the IP address, an address of IP ver. 6 may also be used. In this case, the invention has the same effect as far as using the router and gateway passing the packet from the LAN to the Internet and the response to this packet, but not passing the packet from the Internet to the LAN.

In the embodiment, the terminal 102 is directly connected to the Internet, but even if the terminal 102 is connected to the LAN, as far as communication is started from the terminal 102, there is no problem in communication to the server 104, and the effects of the invention are the same.

Further, when the terminal 102 has the same function as the device 101, even if both the terminal 102 and device 101 are in the LAN, they can start communications mutually, and a completely symmetrical communication system can be achieved.

In the embodiment, the connection destination from the device 101 is the server 104 only, and the server 104 transfers the communication between the terminal 102 and device 101. However if the address of the terminal 102 is noticed via connection request UDP packet 412, the device 101 can transmit the TCP connection request 413 directly to the terminal 102. In such configuration, the terminal 102 and device 101 can communicate directly, and the transfer load of the server 104 is lowered, and other effects are brought about.

In the embodiment, the server only transfers the communication of the terminal and the device, but the server itself can communicate with the device by using the TCP connection. In such configuration, the server presents communication function to the device for the terminal, and also presents services to the device such as setting and monitoring of the device and updating of the software.

In the embodiment, the device 101 and server 104 can be achieved by a computer. At this time, it is possible to create computer programs for executing the sequence shown in FIG. 4 individually for the device 101 and server 104, and they can be stored and distributed in a recording medium. Accordingly, by using a general-purpose computer, it is possible to realize communication from outside of the home.

THIRD EMBODIMENT

A third embodiment of the communication system of the invention is explained.

The network connection of this embodiment is same as shown in FIG. 2. The address assignment is same as in the foregoing embodiments, and only the communication sequence is different. In this embodiment, the terminal is a PC or cellular phone implemented with Web browser, and by using this, it is intended to communicate with the device 101 connected to the LAN by HTTP, and manipulate or acquire contents.

Referring to FIG. 7, the communication sequence of this embodiment is described.

In the communication sequence of the embodiment, the procedure up to preparation for communication through the notice UDP packet is same as in the sequence of the second embodiment shown in FIG. 5. FIG. 7 shows the subsequent procedure.

When the communication is started from the terminal 102 to the device 101, the terminal 102 transmits TCP connection request 607 by SSL to the server 104. As a result, according to the ordinary SSL procedure, server certificate notice 608 is transmitted from the server 104 to the terminal 102, and it is validated at step S624. When validated successfully, cipher communication is enabled. In succession, in the same procedure as in the second embodiment, the sequence from the device connection request 609 to the TCP connection request 611 is executed.

A first point different from the second embodiment is that the device connection request 609 is encrypted. Therefore, the device ID included in the device connection request 609 can be concealed. A second different point is that a random number is generated at step S626 and is stored in the server, and it is noticed to the device by the connection request UDP packet 610.

Consequently, the device 101 transmits TCP/SSL connection request 611, and connects to the server 104 via the TCP connection. As a result, the server certificate notice 612 is transmitted from the server 104 to the device 101 according to the ordinary SSL procedure, and validated (step S627). When validated successfully, cipher communication is enabled.

Thus, after the TCP connection encrypted by SSL is established between the server 104 and device 101, transfer in procedures 613 to 614 is executed, and a page is displayed in the terminal 102. It is followed by, according to user's trigger, transfer of HTTP communication in procedures 615 to 618 and transfer of HTTP communication in procedures 619 to 622 with the session identifiers. Contents of these HTTP transfer are same as in the second embodiment. Only different points from the second embodiment are explained below.

A first point of this embodiment different from the second embodiment is that the communication is encrypted. Accordingly, the device ID, individual information of the device, and other valuable information can be concealed.

A second point of this embodiment different from the second embodiment is that in the session identifier notice 613, the device certificate and the random number transmitted from the server by the connection request UDP packet 610 are noticed as arguments, in addition to the session identifier. The device certificate is to certify the validity of the device 101. The device certificate is verified at step S628, and a subsequent step will be executed only when the device is authentic. Cipher transmission of device certificate is very advantageous when the method of the invention is combined with the validation of device certificate in such procedure.

Further, at step S628, it is validated if the random number of the argument of the session identifier notice 613 is same as the random number stored in the server at step S626 or not, and only when identical, a subsequent step will be executed. Therefore it can be checked if the connection request UDP packet 610 has been duly transmitted or not, and misoperation can be prevented even if a cracker fakes a connection request UDP packet 610.

Moreover, the invention is configured so that a single server is passed in a communication. Hence when the invention is combined with a system which establishes the cipher with the certificate stored at the server side, it is possible to validate each other in a system connecting plural devices and plural terminals mutually only by placing the certificate in the server, without having to place individually in the devices and terminals. As a result, the number of server certificates can be reduced, and the management labor can be saved. In addition, since the direction of the TCP communication between the device 101 and the server 104 is so intended that TCP communication is started from the device 101 side, only a single server certificate is needed at the server 104 side, and this is particularly beneficial for application of SSL.

Meanwhile, it is also possible to change application or non-application of ciphering depending on the confidential requirement of communication contents in every pair of HTTP request and HTTP response, and the ciphering load can be optimized. This embodiment has such effects in addition to the effects of the second embodiment.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The present disclosure relates to subject matter contained in Japanese Patent Application No. 2002-283287, filed on Sep. 27, 2002, which is expressly incorporated herein by reference in its entirety.

The invention claimed is:

1. A server connected to the Internet which transfers communications between at least one device connected to the Internet and at least one terminal connectable to the Internet, wherein the server receives a periodic notice packet which is a connectionless UDP/IP packet from the device, the periodic notice packet including information on an address related to the device, stores or updates address information of the device based on the information included in the received periodic notice packet, transmits a connection request packet which is a connectionless UDP/IP packet to the device in reply to the periodic notice packet using the stored address information of the device if transfer to the device is requested from the terminal, accepts a TCP connection request transmitted from the device to the server in reply to the connection request packet, and transfers communications between the terminal and the device on the TCP connection after the TCP connection is established.

2. The server according to claim 1, wherein the server receives from the terminal a transfer request to the device with an HTTP request including a device ID, and for transferring the communications between the terminal and the device, the server transfers the HTTP request from the terminal on the TCP connection extended by the device, and transfers to the terminal the HTTP response received from the device through the TCP connection.

3. The server according to claim 1, wherein the server receives a plurality of transfer requests from at least one terminal, the server generates individual session identifiers when a plurality of transfer requests are made from the terminal to the device, and transmits the generated session identifiers to the device by the connection request packet, establishes the TCP connection by accepting the TCP connection request sent from the device to the server in reply to the connection request packet, receives the session identifier sent from the device on the established TCP connection, makes the received session identifier correspond to the TCP connection thereby to make a plurality of TCP connections correspond to a plurality of connection requests from the terminal, and only when the terminal requests connection by designating the session identifier and the TCP connection corresponding to the designated session identifier has been already established, transfers the communication from the terminal on the established TCP connection, thereby transferring the communication contents in parallel in each session identifier.

4. The server according to claim 1, wherein the server includes a storage section for storing a final access time of each of the plurality of devices, when receiving a periodic notice packet from the device, the server updates the final access time by a reception time, and when transfer to the device is requested from the terminal, the server rejects the connection request if the difference between the final access time of the device and a present time is more than a specified period, or transmits the connection request packet to the device in reply to the periodic notice packet if the difference is not more than the specified period.

5. The server according to claim 1, wherein the server includes a storage section for storing a final access time of each of the plurality of devices, the server transmits maximum access acknowledge period information preliminarily to the device, when receiving a periodic notice packet from the device, updates the final access time by a reception time of the notice packet, and when transfer to the device is requested from the terminal, the server rejects the connection request if the difference between the final access time of the device and a present time is more than the value indicated by the maximum access acknowledge period information, or transmits the connection request packet to the device in reply to the periodic notice packet if the difference is not more than the value indicated by the maximum access acknowledge period information.

6. The server according to claim 1, wherein the server includes a cipher communication section that stores a server certificate, encrypts and decrypts the communications, when transferring confidential information between the terminal and the device, the server transmits the server certificate preliminarily to the terminal, when transferring the confidential information from the terminal to the device through the TCP connection established by the device, the server receives encrypted confidential information from the terminal, decrypts the received information by the cipher communication section, and then encrypts the decrypted information by the cipher communication section to transmit to the device, and when transferring the confidential information from the device to the terminal through the TCP connection established by the device, the server receives encrypted confidential information from the device, decrypts the received information by the cipher communication section, and encrypts the decrypted information by the cipher communication section to transmit to the terminal.

7. The server according to claim 1, wherein the server includes a cipher communication section that stores a server certificate, encrypts and decrypts the communications, when transferring confidential information between the terminal and the device, the server transmits the server certificate preliminarily to the terminal and the device, respectively, when transferring the confidential information from the terminal to the device through the TCP connection established by the device, the server receives encrypted confidential information from the terminal, decrypts the received information by the cipher communication section, and then encrypts the decrypted information by the cipher communication section to transmit the encrypted information to the device, and when transferring the confidential information from the device to the terminal through the TCP connection established by the device, the server receives encrypted confidential information from the device, decrypts the received information by the cipher communication section, and encrypts the decrypted information by the cipher communication section to transmit to the terminal.

8. A computer readable recording medium which stores programs enabling a programmable apparatus to operate as the server according to claim 1.

9. A device connected to the Internet for communicating with a server connected to the Internet, wherein the device transmits a notice packet which is a connectionless UDP/IP packet periodically to the server, transmits a TCP connection request to the server when receiving a connection request packet which is transmitted in reply to the notice packet from the server, the connection request packet being a connectionless UDP/IP packet, and communicates with the server on the TCP connection after the TCP connection is established.

10. The device according to claim 9, wherein the device receives an HTTP request from the server, and transmits an HTTP response to the server for communicating with the server on the TCP connection.

11. The device according to claim 10, wherein the device includes a Web server module and a transfer module, the Web server module receives an HTTP request from the transfer module, and returns an HTTP response, and the transfer module transmits a TCP connection request to the server to establish the TCP connection when receiving the connection request packet from the server, receives an HTTP request from the server on the TCP connection to transfer to the Web server, and receives an HTTP response from the Web server to transfer to the server on the TCP connection.

12. The device according to claim 9, wherein the device establishes the TCP connection with the server when receiving a connection request packet accompanied by a session identifier from the server, transmits the session identifier to the server on the established TCP connection, and communicates with the server on the TCP connection after the TCP connection is established.

13. The device according to claim 9, wherein the device receives beforehand maximum access acknowledge period information from the server to store the information in the device, and transmits a notice packet periodically in a shorter period than the period indicated by the maximum access acknowledge period information.

14. The device according to claim 9, wherein the device includes a cipher communication section that encrypts and decrypts communications, and the device encrypts confidential information by the cipher communication section and conducts transmission or reception of the confidential information with the server on the established TCP connection.

15. The device according to claim 9, wherein the device includes a section that verifies the server certificate and a cipher communication section that encrypts and decrypts communications, the device receives a server certificate from the server to verify the certificate, and if the certificate is authentic, subsequently the device encrypts confidential information by the cipher communication section, thus to conduct transmission or reception of the confidential information with the server on the established TCP connection.

16. A computer readable recording medium which stores programs enabling a programmable apparatus to operate as the device according to claim 9.

17. A communication system comprising at least one device and a server those connected to the Internet, the system transferring communications between the at least one device and at least one terminal connectable to the Internet via the server, wherein the device transmits a notice packet which is a connectionless UDP/IP packet periodically to the server, the notice packet including information on an address related to the device, and stores or updates address information of the device based on the information included in the notice packet received from the device, the server transmits a connection request packet which is a connectionless UDP/IP packet to the device in reply to the notice packet using the stored address information of the device when transfer to the device is requested from the terminal, the device transmits a TCP connection request to the server when receiving the connection request packet from the server, and the server accepts the TCP connection request transmitted from the device to the server in reply to the connection request packet, thus to establish the TCP connection, and the server transfers communications between the terminal and the device on the TCP connection after the TCP connection is established.

18. The communication system according to claim 17, wherein
the terminal requests the transfer to the device by transmitting an HTTP request including a device ID to the server,
the server transfers the HTTP request from the terminal onto the TCP connection extended from the device when transferring communications between the terminal and the device,
the device processes the transferred HTTP request, and returns a corresponding HTTP response to the server on the TCP connection, and
the server transfers the HTTP response to the terminal.

19. The communication system according to claim 17, wherein
the server is operable to receive a plurality of transfer requests from the at least one terminal,
when a plurality of transfer requests are made from the terminal to the device, the server generates a respective session identifier unique to each transfer request to notify the device of the session identifier by the connection request packet,
the device establishes the TCP connection to the server to transmit the session identifier to the server on the established TCP connection when receiving a connection request packet accompanied by the session identifier from the server, and communicates with the server on the TCP connection after the TCP connection is established,
the server establishes the TCP connection by accepting the TCP connection request sent to the server from the device in reply to the connection request packet, receives the session identifier sent from the device on the TCP connection, makes the received session identifier correspond to the TCP connection, and makes a plurality of TCP connections correspond to a plurality of connection requests from the terminal, and
only when the terminal requests connection by designating the session identifier and the TCP connection corresponding to the designated session identifier has been already established, the server transfers the communication from the terminal on the established TCP connection, and transfers contents of the communication in parallel in each session identifier.

20. The communication system according to claim 17, wherein
the server includes a data storage section that stores a final access time of each device in a plurality of devices,
the server transmits maximum access acknowledge period information beforehand to the device,
the device receives the maximum access acknowledge period information and stores the received maximum access acknowledge period information, and transmits a notice packet periodically in a shorter period than the period indicated by the maximum access acknowledge period information,
when receiving the notice packet from the device, the server updates the final access time by a reception time, and
when transfer to the device is requested from the terminal, the server rejects the connection request if the difference between the final access time of the device and a present time is over a specified period, or transmits the connection request packet to the device in reply to the notice packet if the difference is within the specified period.

21. The communication system of claim 17, wherein
the server includes a first cipher communication section that holds a server certificate, and encrypts and decrypts communications,
the terminal includes a verification section that verifies the server certificate and a second cipher communication section that encrypts and decrypts communications,
the device includes a third cipher communication section that encrypts and decrypts communications,
the server transmits beforehand the server certificate to the terminal when transferring confidential information between the terminal and the device,
the terminal validates the server certificate, and if the certificate is authentic, encrypts the confidential information by the second cipher communication section, thereby conducting transmission or reception of the confidential information with the server,
the device encrypts the confidential information by the third cipher communication section on the established TCP connection, thereby conducting transmission or reception of the confidential information with the server,
when transferring the confidential information from the terminal to the device through the established TCP connection, the server receives encrypted confidential information from the terminal, decrypts the received information by the first cipher communication section, and encrypts the decrypted information by the first cipher communication section to transmit the encrypted information to the device, and
when transferring the confidential information from the device to the terminal through the TCP connection established by the device, the server receives encrypted confidential information from the device, decrypts the received information by the first cipher communication section, and encrypts the decrypted information by the first cipher communication section to transmit the encrypted information to the terminal.

22. The communication system according to claim 17, wherein
the server includes a first cipher communication section that stores a server certificate, and encrypts and decrypts the communications,
the terminal includes a verification section that verifies the server certificate and a second cipher communication section that encrypts and decrypts the communications,
the device includes a verification section that verifies the server certificate and a third cipher communication section that encrypts and decrypts the communications,
the server transmits beforehand the server certificate to the terminal and the device individually when transferring confidential information between the terminal and the device,
the terminal validates the server certificate, and if the certificate is authentic, then the terminal encrypts the confidential information by the second cipher communication section, thereby conducting transmission and reception of confidential information with the server,
the device validates the server certificate, and if the certificate is authentic, then the device encrypts the confidential information by the third cipher communication section on the TCP connection, thereby conducting transmission and reception of confidential information with the server,
when transferring the confidential information from the terminal to the device through the TCP connection established by the device, the server receives encrypted confidential information from the terminal, decrypts the received information by the first cipher communication section, and encrypts the decrypted information by the first cipher communication section to transmit the encrypted information to the device, and when transferring the confidential information from the device to the terminal through the TCP connection established by the device, the server receives encrypted confidential information from the device, decrypts the received information by the first cipher communication section, and encrypts the decrypted information by the first cipher communication section to transmit the encrypted information to the terminal.

23. A server connected to the Internet for transferring communications between at least one device connected to the Internet, and at least one terminal connectable to the Internet, the server includes a storage section that stores a final access time in each device in a plurality of devices, the server receives first and second notice packets which are connectionless UDP/IP packets periodically from the device, the first and second notice packets including information on an address related to the device, the server stores or updates address information of the device based on the information included in the received notice packet, when receiving the first notice packet from the device, the server updates the final access time by a reception time, but not update the final access time when receiving the second notice packet from the device, when transfer to the device is requested from the terminal, the server rejects the connection request if the difference between the final access time of the device and a present time is over a specified period, and transmits a connection request packet which is a connectionless UDP/IP packet to the device in reply to the first and second notice packets if the difference is within the specified period, and the server accepts a TCP connection request transmitted from the device to the server in reply to the connection request packet, and the server transfers communications between the terminal and the device on the TCP connection after the TCP connection is established.

24. A computer readable recording medium which stores programs enabling a programmable apparatus to operate as the server according to claim 23.

25. A device connected to the Internet for communicating with a server connected to the Internet, the device transmits a first and a second notice packet which are connectionless UDP/IP packets periodically to the server, the transmission period of the first notice packet being longer than the transmission period of the second notice packet, and the device transmits a TCP connection request to the server when receiving a connection request packet which is transmitted in reply to the notice packet from the server, the connection request packet being a connectionless UDP/IP packet, and the device communicates with the server on the TCP connection after the TCP connection is established.

26. A computer readable recording medium which stores programs enabling a programmable apparatus to operate as the device according to claim 25.

27. A communication system comprising at least one device and a server those connected to the Internet, the system transferring communications between the at least one device and at least one terminal connectable to the Internet via the server, wherein the server includes storage section that stores a final access time in each device in a plurality of devices, the device transmits first and second notice packets which are connectionless UDP/IP packets periodically to the server, the transmission period of the first notice packet being longer than that of the second notice packet, the first and second notice packets including information on an address related to the device, the server receives the first and second notice packets from the device, and stores or updates address information of the device based on the information included in the received notice packet, when receiving the first notice packet from the device, the server updates the final access time by a reception time, but the server does not update the final access time when receiving the second notice packet from the device, when transfer to the device is requested from the terminal, the server rejects the connection request if the difference between the final access time of the device and a present time is over a specified period, and transmits a connection request packet which is a connectionless UDP/IP packet to the device in reply to the first and second notice packets if the difference is within the specified period, the device transmits a TCP connection request to the server when receiving the connection request packet from the server, and the server accepts a TCP connection request transmitted from the device to the server in reply to the connection request packet, thus to establish the TCP connection, and the server transfers communications between the terminal and the device on the TCP connection after the TCP connection is established.

* * * * *